May 10, 1966 M. DIAMOND 3,251,061

MICROWAVE REFLECTOR

Filed Feb. 12, 1964

INVENTOR.
MAURICE DIAMOND
BY
*Weingarten, Orenbuch & Pandiscio*
ATTORNEYS

United States Patent Office 3,251,061
Patented May 10, 1966

3,251,061
MICROWAVE REFLECTOR
Maurice Diamond, Framingham, Mass., assignor to Laboratory for Electronics, Inc., Boston, Mass., a corporation of Delaware
Filed Feb. 12, 1964, Ser. No. 344,330
3 Claims. (Cl. 343—18)

This invention relates generally to electromagnetic wave energy reflectors and pertains more particularly to an omni-directional passive microwave reflector utilizing a dielectric lens to provide a directional signal returned along the path of the incident microwave signal.

In accordance with the invention, a grid structure of electrical conductors is arranged on the surface of a Luneberg lens in such fashion as to allow incident electromagnetic wave energy to enter the lens, be focused upon a reflective surface, and be reflected in the direction from which came the incident energy. Because of the construction of the apparatus, it reflects energy equally well at all azimuth angles so that the device is an omni-azimuthal reflector. Further, because of the focussing property, the reflected energy appears to be reradiated from a single point source.

Omni-azimuthal radar reflectors are known which behave as single point sources. U.S. Patent No. 2,921,305 describes such a reflector constructed of a Luneberg lens having an equatorial reflecting ribbon. An analogue of that reflector is described in The Microwave Journal, March 1963, vol. VI, Number 3, pages 105 to 109, in an article entitled, "A New Type of Omni-Azimuthal Radio-Echo Enhancer." Those prior art radar reflectors are severely limited with respect to the elevation angle of the incident wave energy. That is, the radar reflector is effective only when the incident energy does not exceed a small angle, in the order of fifteen or twenty degrees, with respect to the equatorial plane.

The primary object of the invention is to provide a radar reflector that is significantly more insensitive than are prior art reflectors to the direction of the incident wave energy.

A secondary object of the invention is to provide a radar reflector that discriminates between incident waves of different polarization.

The invention is useful as an emergency aid for increasing the radar return from lifeboats, rafts, or other objects sought by air-sea rescue craft. The invention, further, is useful for marking ship channels and for other navigational purposes. Because the invention is sensitive to the direction of polarization of incident wave energy, an embodiment sensitive to one polarization can be used to mark one edge of the channel and an embodiment sensitive to a different polarization can be employed to mark the other edge of the channel.

The invention, both as to its construction and its mode of operation, can be apprehended from a consideration of the following exposition and the accompanying drawings in which.

Figure 1:
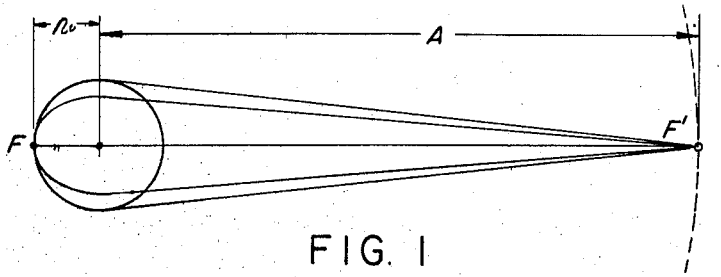
FIGS. 1 and 2 are ray diagram depicting the characteristics of a Luneberg lens.
Figure 2:
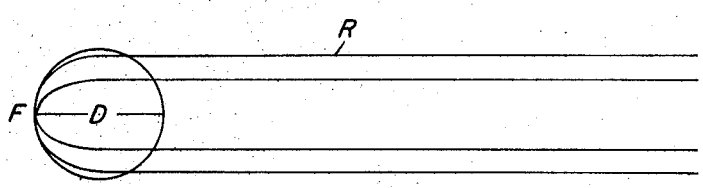

The principal characteristics of a Luneberg lens is indicated in FIG. 1 where the image of an object at a radius A is exactly focused at the surface of the lens of smaller radius $r_0$. In the limiting case where A approaches infinity, the conjugate focus $F^1$ is at a nearly infinite distance so that rays reflected at the focus F are collimated and form a reflected beam. A Luneberg lens, therefore, is spherical and is characterized by focusing parallel rays incident upon one hemispherical face to a point on the opposite hemispherical face where a diameter of the sphere, parallel to the incident rays, intersects the opposite hemispherical surface. This characteristic property of the Luneberg lens is illustrated in FIG. 2 where the parallel rays of light R incident on the spherical lens are focused to a point F at which a diameter D of the sphere, parallel to the incident rays, intersects the opposite hemispherical surface. A Luneberg, lens, of radius $r_0$, for the limiting case, has a refraction index $n$ that varies as function of the radial distance $r$ within the sphere in accordance with the equation.

$$n = \sqrt{2 - \left(\frac{r}{r_0}\right)^2}$$

The refraction index $n$ of a Luneberg lens, therefore, changes as one proceeds radially outward from the center of the sphere. For a detailed discussion of the Luneberg lens see "Virtual Source Luneberg Lens" by Peeler, Kelleher and Coleman, in Transactions of the IRE, vol. AP-2, No. 3, July 1954, pp. 94 to 99 and other works cited in the article.

Figure 4:
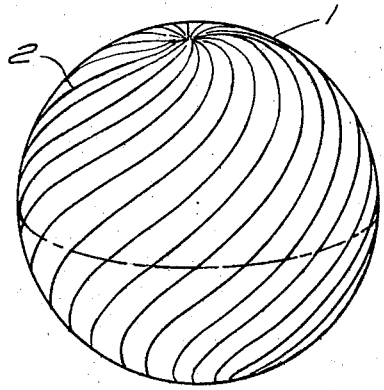
FIG. 4 depicts an embodiment of the invention.
Figure 3:
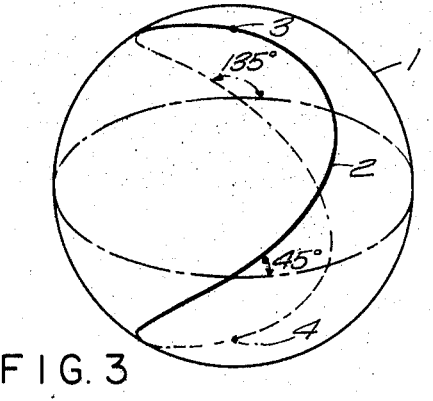
FIG. 3 is an elemental form of the invention showing the curvature of a conductive strip on a Luneberg lens.

Referring now to FIG. 3, there is shown a Luneberg lens 1 having an electrically conductive strip 2 secured on its surface so that the strip is at an angle of 45° to the lines of longitude and latitude. That is, assuming the poles to be at 3 and 4, the conducting strip 2 bisects the angles formed by the intersections of the longitude and latitude lines. The invention, as depicted in FIG. 4, utilizes many such conductive strips, the distance between adjacent strips, at the equator, preferably being one eighth of the wavelength, $\lambda/8$, of the incident energy. The $\lambda/8$ spacing of the strips is not critical, although increased spacing results in a diminution of the reflected energy. The spacing, however, must be somewhat less than $\lambda/2$ for with $\lambda/2$ spacing practically none of the wave energy is reflected.

The conductive strips may be thin copper ribbons adhered to or superficially embedded in the Luneberg lens. Preferably, the strips are a conductive film painted or evaporated onto the spherical surface. The techniques for applying the conductive strip to the lens are many and varied and the particular technique used does not affect the essential nature of the invention. The width of a conductive strip should be approximately $\lambda/24$ of the mean operational frequency. This dimension is not critical however and is influenced by parameters such as the frequency range for which the reflector is constructed, the diameter of the Luneberg lens, and the depth of the conductive strip.

To an observer who is within the spherical lens and is aligned on the north-south axis, all conductive strips are at 45° whatever the lattitude or longitude; to an outside observer looking toward the lens, when the strips on the front hemisphere are at an angle of 45°, the strips on the rear hemisphere appear to be orthogonal to the strips of the front hemisphere and, therefore, at an angle of 135°. Assuming wave energy polarized at 135° to be incident on the lens, it passes through the conductors of the front hemisphere without appreciable loss as the conductors are normal to the vector of polarization. The wave energy is focused by the Luneberg lens to a point on the surface of the rear hemisphere. The conductors of the rear hemisphere extend in the direction of the polarization vector of the wave energy and, as the strip spacing is a fraction of the wavelength of the incident energy, the focused energy cannot pass out through the surface fo the rear hemisphere, but rather is reflected toward the front hemisphere where it emerges from the lens as a collimated beam directed along the path of the incident energy.

Where wave energy polarized at 45° is incident on the lens, it is reflected from the front surface and, because of the spherical shape of that surface, the reflected energy is scattered. Incident wave energy polarized at angles other than 45° or 135°, can be resolved into orthogonal components at 45° and 135°, the 135° component being reflected as a collimated beam directed along the path of the incident energy whereas the 45° component is scattered and permits little if any return of the impinging energy.

Figure 5:
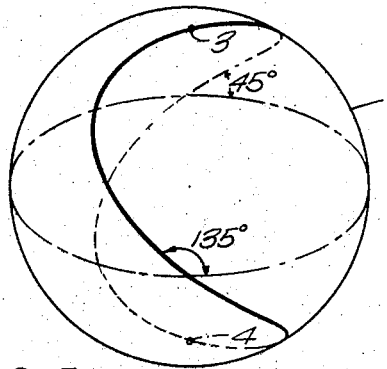
FIG. 5 shows an embodiment of the invention in which the conductive strips curve in the opposite direction.

As the reflector of FIG. 4 is sensitive to the polarization of the incident wave energy, a circularly polarized beam impinging on the reflector results in reflections of plane polarized wave energy which achieve maximum intensity twice during each revolution of the rotating polarization vector of the incident energy. During the same revolution of the rotating polarization vector, minimum intensity will twice occur. Where the reflector has its conductive strips curved in the opposite direction, as in FIG. 5, it behaves in the same manner as the embodiment of FIG. 4 except that the reflections of circularly polarized wave energy incident upon it are 90° out of phase with respect to their maxima and minima as compared with maximal and minimal reflections from the FIG. 4 embodiment, assuming the incident wave energy to be in the azimuthal plane in both cases.

As can be observed from FIG. 4, the conductive strips have their widest spacing at the equator and converge as those strips approaches the poles. At the higher latitudes the strips become so densely packed as to form a solid conductive cap upon the poles. To preserve the desired minimum spacing between conductive strips, it has been found feasible to discontinue some of the strips at the higher latitudes. For example, at a latitude of 60°, alternate strips are discontinued to prevent the strips from packing too densely together, at 75° of latitude, alternate ones of the remaining strips are discontinued to maintain the minimum spacing between strips. At the poles, the remaining strips converge to form conductive caps. The procedure of discontinuing alternate strips, however, tends to minimize the polar area covered by the cap.

The spacing between conductive strips may be smaller than λ/8 and may be as little as λ/10. However, where the strip spacing is closer than λ/8, less of the incident energy passes into the Luneberg lens because the closely spaced strips tend to scatter by reflection some of the wave energy impinging on the front hemisphere. As a corollary, however, nearly all the entering energy is reflected as the closely spaced strips of the rear hemisphere appear to that energy to be a solid conductive surface. The spacing of the strips can by empirical means be chosen to provide the optimum wave energy reflection by balancing the scattering effect of the strips on the front hemisphere against the reflective effect of the strips on the rear hemisphere.

The reflector provides the best response when the impinging microwave energy is in the azimuthal plane. The response from the passive reflector diminishes as the angle increases between the azimuthal plane and the plane of the incident microwave energy. However, even when the plane of the incident energy is at 90° to the azimuthal plane, there is an appreciable amount of energy reflected as a collimated beam where the device is constructed using the procedure of discontinuing alternate strips at the higher lattitudes. The reflector, therefore, is an omnidirectional device.

What is claimed is:

1. In a microwave reflector of the type utilizing a Luneberg lens sphere, the improvement comprising
  a plurality of electrically conductive strips on the surface of the spherical Luneberg lens, the conductive strips being at a fixed angle with respect to the sphere's lines of longitude whereby the conductive strips tend to converge as they approach the poles of the sphere, and the spacing between the conductive strips being less than a half wavelength of the electromagnetic wave energy to be reflected.

2. In a microwave reflector of the type utilizing a Luneberg lens sphere, the improvement comprising
  a plurality of electrically conductive strips on the surface of the spherical Luneberg lens, the conductive strips being at an angle of 45° with respect to the sphere's lines of latitude and longitude whereby the conductive strips tend to converge as they near the poles of the sphere, the spacing between the conductive strips being less than one half of the wavelength of electromagnetic wave energy to be reflected, and the width of the conductive strips being in the order of one twentieth of that wavelength.

3. In a microwave reflector of the type utilizing a Luneberg lens sphere, the improvement comprising
  a plurality of electrically conductive narrow strips on the surface of the spherical Luneberg lens, the conductive strips being at an angle of 45° with respect to the lines of latitude and longitude of the sphere whereby the conductive strips tend to intersect only at the poles of the sphere, the minimum spacing between the conductive strips being in the order of one tenth of the wavelength of electromagnetic energy to be reflected, and alternate ones of the conductive strips being discontinued adjacent the poles so as to maintain the minimum spacing.

References Cited by the Examiner
UNITED STATES PATENTS

| | | | |
|---|---|---|---|
| 2,871,477 | 5/1954 | Hatkin | 343—18 X |
| 2,921,305 | 1/1960 | Cole | 343—18 |
| 2,936,453 | 5/1960 | Coleman | 343—18 |
| 3,138,789 | 6/1964 | Greenwood | 343—18 |

LEWIS H. MYERS, *Primary Examiner.*

CHESTER L. JUSTUS, *Examiner.*

G. M. FISHER, *Assistant Examiner.*